(12) United States Patent
Seok

(10) Patent No.: US 8,179,867 B2
(45) Date of Patent: May 15, 2012

(54) APPARATUS AND METHOD FOR TRANSMISSION OPPORTUNITY IN MESH NETWORK

(75) Inventor: Yongho Seok, Anyang-si (KR)

(73) Assignee: LG Electronics Inc., Seoul (KR)

( * ) Notice: Subject to any disclaimer, the term of this patent is extended or adjusted under 35 U.S.C. 154(b) by 441 days.

(21) Appl. No.: 12/463,185

(22) Filed: May 8, 2009

(65) Prior Publication Data
US 2009/0279514 A1    Nov. 12, 2009

(30) Foreign Application Priority Data
May 9, 2008   (KR) .................. 10-2008-0043667

(51) Int. Cl.
*H04W 72/12* (2009.01)
(52) U.S. Cl. ....................................... 370/336
(58) Field of Classification Search .......... 370/310, 370/328, 329, 336, 345, 347, 348, 349, 350
See application file for complete search history.

(56) References Cited

U.S. PATENT DOCUMENTS

| | | | |
|---|---|---|---|
| 7,564,826 B2 * | 7/2009 | Sherman et al. ............... 370/338 |
| 2006/0268746 A1 * | 11/2006 | Wijting et al. ................. 370/254 |
| 2007/0014269 A1 | 1/2007 | Sherman et al. |
| 2007/0127380 A1 * | 6/2007 | Abraham et al. ............. 370/235 |
| 2009/0097428 A1 * | 4/2009 | Kneckt et al. ................. 370/311 |
| 2009/0279487 A1 * | 11/2009 | Reumerman et al. ......... 370/329 |

OTHER PUBLICATIONS

Ranjitkar et al., "Performance Enhancement of IEEE 802.11s Mesh Networks Using Aggressive Block Ack Scheme", The International Conference on Information Networking 2008 (ICOIN 2008), Jan. 23, 2008, pp. 1-4.
Hiertz et al., "Principles of IEEE 802.11s", Computer Communications and Networks 2007 (ICCCN 2007), Proceedings of the 16th International Conference, Aug. 13, 2007, pp. 1002-1007.

* cited by examiner

*Primary Examiner* — Chi Pham
*Assistant Examiner* — Robert Lopata
(74) *Attorney, Agent, or Firm* — Birch, Stewart, Kolasch & Birch, LLP

(57) ABSTRACT

An apparatus and method of transmission opportunity in a mesh network is disclosed. A beacon timing from a receiver MP is received. The beacon timing includes a beacon reception timing of a received beacon frame that is received by the receiver MP from a neighboring MP of the receiver MP. A transmission opportunity is determined in order not to be extended across the beacon reception timing.

6 Claims, 9 Drawing Sheets

APPARATUS AND METHOD FOR TRANSMISSION OPPORTUNITY IN MESH NETWORK

CROSS-REFERENCE TO RELATED APPLICATIONS

This application claims the benefit of priority of Korean Patent Application No. 2008-0043667 filed on May 9, 2008, which is incorporated by reference in its entirety herein.

BACKGROUND

1. Technical Field

The present invention relates to a wireless communication, and more particularly, to transmission opportunity (TXOP) in a mesh network.

2. Discussion of Related Art

With the advancement of information communication technologies, various wireless communication technologies have been developed. Among the wireless communication technologies, there is a wireless local area network (WLAN) that is a technology whereby super high-speed Internet access is possible in a wireless fashion in homes or businesses or in a region providing a specific service by using a portable terminal such as a personal digital assistant (PDA), a laptop computer, a portable multimedia player (PMP), etc.

A mesh network can be defined as a network which supports direct communication between a plurality of wireless devices having a relay function not via an access point (AP). Functionally, a distribution system (DS) of the AP can be replaced with an interoperable wireless link or a multi-hop path between the plurality of wireless devices. According to the mesh network, any one of the wireless devices can establish an interoperable peer-to-peer wireless link with other neighboring wireless devices and/or APs. Therefore, there is an advantage in that a wireless connection can be more flexibly established.

In the mesh network, one wireless device can be connected to other wireless devices and thus can have a plurality of communication paths. Such a communication path between the wireless devices is also referred to as a wireless mesh link, or simply a mesh link or a peer link. Although such a wireless device is referred to as a mesh point (MP), the term is not limited to the MP. If the MP provides a function of an access point (AP) in addition to the aforementioned relay function, the MP is referred to as a mesh access point (MAP).

Such a mesh network has many advantages, e.g., flexibility of network implementation, reliability caused by a detour path, and reduction of power consumption resulted from a decreased communication distance, etc. More specifically, by using the mesh network, a network can be flexibly implemented between MPs in a place where there is no existing communication network. In addition, the mesh network can ensure a plurality of detour paths due to interconnections among a plurality of MPs. Therefore, even if one MP is erroneous, data can be transmitted through another path. Further, since the mesh network can perform communication via a neighbor MP even if a coverage of one MP is not large enough, telecommunication can be achieved with low power.

IEEE (Institute of Electrical and Electronics Engineers) 802.11 standard is well known in the WLAN. The architecture of the MAC sublayer in the IEEE 802.11 includes the distributed coordination function (DCF), the point coordination function (PCF), the hybrid coordination function (HCF), and their coexistence. The HCF uses both a contention-based channel access method, called the enhanced distributed channel access (EDCA) mechanism for contention-based transfer and a controlled channel access, referred to as the HCF controlled channel access (HCCA) mechanism, for contention-free transfer. EDCA may contends for transmission opportunities (TXOPs). This means that a plurality of MPs may use same TXOPs. A TXOP is an interval of time when a particular quality of service (QoS) station has the right to initiate frame exchange sequences onto the wireless medium (WM). The TXOP is either obtained by the station by successfully contending for the channel or assigned by the hybrid coordinator (HC). Contention (or collision) may cause delay of services and degradation of QoS.

In a mesh network, contentions may occur in multiple hop range. There is a need to mitigate collision in a contention-based mesh network.

SUMMARY

The present invention provides an apparatus and a method for determining transmission opportunity (TXOP) in order to mitigate collisions in a contention-based mesh network.

The present invention also provides an apparatus and a method for communicating in a contention-based mesh network to mitigate collision between a beacon and data.

In an aspect, a method of communicating in a contention-based mesh network, performed by a transmitter mesh point (MP), is provided. The method includes receiving a beacon timing from a receiver MP, the beacon timing including a beacon reception timing of a received beacon frame, the received beacon frame being received by the receiver MP from a neighboring MP of the receiver MP, determining a transmission opportunity (TXOP) not to be extended across the beacon reception timing, and transmitting a frame from the transmitter MP to the receiver MP within the TXOP.

The beacon timing may be received in a beacon frame or a probe response frame, and the beacon frame and the probe response frame may be used for synchronization between MPs.

The beacon timing may include a plurality of beacon reception timings received from a plurality of neighboring MPs of the receiver MP, and the TXOP may not be extended across the plurality of beacon reception timings.

The frame may not be a beacon frame. The frame may be a Request-to-Send (RTS) frame to be used to determine whether a wireless medium is idle or a data frame for data transmission. A duration included in the RTS frame may be within the TXOP. The duration may defines the period of time that the wireless medium is to be reserved to transmit the data frame.

In another aspect, an apparatus for wireless communication in a contention-based mesh network is provided. The apparatus includes a transceiver, and a processor operatively connected to the transceiver, the processor configured to receive a beacon timing from a receiver MP, the beacon timing including a beacon reception timing of a received beacon frame, the received beacon frame being received by the receiver MP from a neighboring MP of the receiver MP, determine a transmission opportunity (TXOP) not to be extended across the beacon reception timing, and transmit a frame to the receiver MP within the TXOP.

DESCRIPTION OF EXEMPLARY EMBODIMENTS

Figure 1:
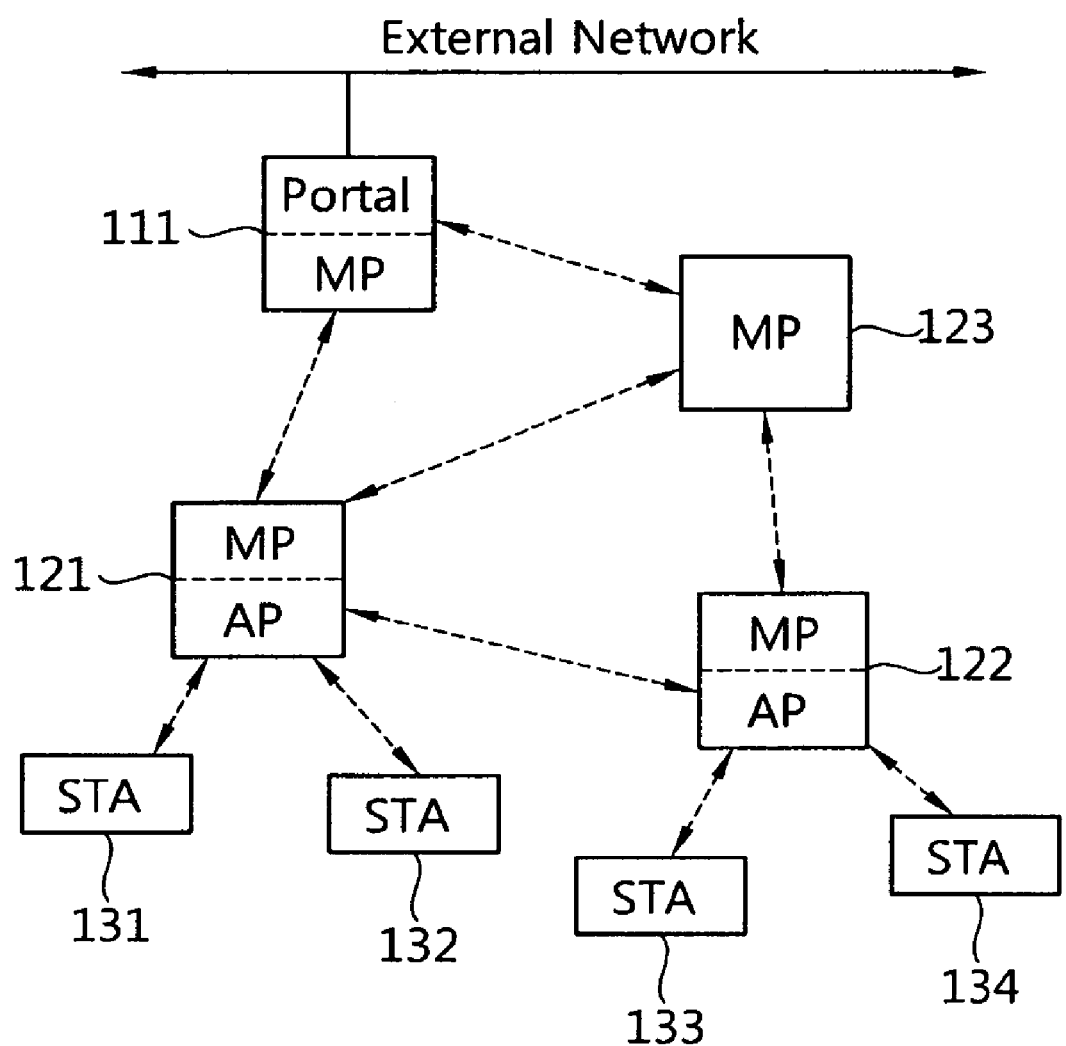
FIG. 1 shows an exemplary structure of a wireless mesh network.

FIG. 1 shows an exemplary structure of a mesh network. The mesh network has a unique mesh identifier (ID). The mesh ID is a shortened term used to identify a group of mesh points (MPs) constituting the wireless mesh network. There is no restriction on how to assign the mesh ID.

Referring to FIG. 1, the mesh network includes one or a plurality of stations (STAs) 131, 132, 133, and 134 and one or more wireless devices, i.e., MPs 111, 121, 122, and 123. Among these MPs, the MPs indicated by the reference numerals 121 and 122 are connected to the STAs 131, 132, 133, and 134. Thus, each of the MPs 121 and 122 acts as a mesh access point (MAP) defined as an MP which also functions as an access point (AP). In addition, the MP indicated by the reference numeral 111 is an MP connected to an external network in a wired or wireless fashion, which is called a mesh portal.

Each of the STAs 131 to 134 is a non-AP station and is an arbitrary functional medium including a medium access control (MAC) and physical layer interface for a wireless medium, conforming to the institute of electrical and electronics engineers (IEEE) 802.11 standard. Further, each of the STAs 131 to 134 supports transmission and/or reception of an aggregated MAC service data unit (A-MSDU), and announces its multicast registration information to the connected MAP 121 or 122. In addition to the terminology of a wireless station, the STA may also be referred to as a wireless transmit/receive unit (WTRU), a mobile terminal, a wireless node, a user equipment (UE), a mobile station (MS), and a mobile subscriber unit, etc.

Each of the MPs 111, 121, 122, and 123 is a constitutional element of the wireless mesh network and is one of IEEE 802.11-based functional entities including the MAC and physical layer interface conforming to the IEEE 802.11 standard. Each of the MPs 111, 121, 122, and 123 is a wireless device supporting a mesh service. The mesh service includes various services for enabling direct communication between the MPs constituting the mesh network. Communication between two MPs (e.g., the MPs indicated by reference numbers 121 and 123) for providing the mesh service is achieved through a peer link or a mesh link which is a direct link established between the two MPs. Each of the MPs 111, 121, 122, and 123 finds one or more candidate MPs through active scanning or passive scanning, and thereafter establishes the mesh link with the candidate MPs according to a typical link establishment procedure.

In order for two or more MPs to configure a mesh network by establishing the peer link with each other or in order for another MP to participate in an existing mesh network, the same mesh profile has to be used between the MPs establishing the peer link. Each MP supports at least one mesh profile. The mesh profile includes a mesh ID, a path selection protocol ID, and a path selection metric ID. In addition, the mesh profile may further include a congestion control mode ID.

As described above, among the MPs, an MP which also functions as an AP is particularly referred to as an MAP. Therefore, in addition to the aforementioned functions of the MPs, each of the MAPs 121 and 122 also functions as an AP for an associated station having a connection established to the MAPs 121 and 122. In addition to the terminology of an access point, the AP may also be referred to as a centralized controller, a base station (BS), a node-B, a site controller, etc.

Hereinafter, a method and apparatus for a transmission opportunity (TXOP) in a mesh network is disclosed.

A distributed coordination function (DCF) based on an institute of electrical and electronics engineers (IEEE) 802.11 medium access control (MAC) protocol and a hybrid coordination function (HCF) based on a point coordination function (PCF) employ contention-based enhanced distributed channel access (EDCA), which is an access scheme for providing data frame by a provider to a plurality of users, and HCF controller channel access (HCCA) based on a non-contention-based channel access scheme using a polling mechanism. The HCF includes a medium access mechanism for improving a quality of service (QoS) of the WLAN, and can transmit QoS data in both a contention period and a non-contention period. The DCF is contention-based asynchronous access scheme. The PCF is a polling-based synchronous access scheme in which polling is periodically performed so that all users can receive data frames.

The contention-based channel access scheme (i.e., EDCA) permits differentiated medium access for frames having 8 types of user priorities. Frames arrived to a MAC layer from a higher layer have specific user priority values carried on MAC headers of respective QoS data frames.

To transmit the QoS data frames including these priority values, a QoS station implements 4 access categories (ACs). A user priority of a frame arrived to the MAC layer is allocated to one corresponding AC. Thus, a TXOP is obtained when EDCA contention is successful. The TXOP is an interval of time when a station has the right to initiate frame exchange sequences onto the wireless medium (WM). The TXOP may be defined by a starting time and a maximum duration. Further, the TXOP is used to assign a specific time for transmitting a frame by the specific station and to ensure the assignment of the specific time. A start time and a maximum transmission time of the TXOP may be determined by an access point (AP).

An EDCA parameter set is a core element of the EDCA scheme and is a field indicating parameters for traffic of the user priority. Table 1 below shows an example of the EDCA parameter set.

TABLE 1

| AC | CWmin | CWmax | AIFS | TXOP Limit OFDM/CCK-OFDM PHY |
|---|---|---|---|---|
| 0 | aCWmin | aCWmax | 9 | 0 |
| 1 | (aCWmin + 1)/2 − 1 | aCWmin | 6 | 0 |
| 2 | (aCWmin + 1)/4 − 1 | (aCWmin + 1)/2 − 1 | 3 | 0 |
| 3 | (aCWmin + 1)/4 − 1 | (aCWmin + 1)/2 − 1 | 2 | 0 |

The EDCA parameter set has values of AIFS[AC], CWmin[AC], CWmax[AC], etc., which can be carried on a beacon frame by an AP and then be advertised to each station. Basically, the lower the values of AIFS[AC] and CWmin[AC], the higher the priority. Accordingly, a channel access delay decreases and thus more bands can be used in a given traffic environment. When the specific station initiates transmission as described above, a transmission time is determined based on the TXOP. An AP delivers the EDCA parameters (e.g., AIFS[AC], CWmin[AC], CWmax[AC], etc.) and an EDCA TXOP time (i.e., TXOP Limit [AC]) to each station by carrying these values on the beacon frame.

When the TXOP is obtained by the EDCA scheme, MPs transmit various frame within the TXOP. The TXOP may be regulated by a receiver MP. If a TXOP obtained by a transmitter MP collides with reserved timing information of the receiver MP, the receiver MP can compulsively adjust the TXOP of the transmitter MP. In addition, if the transmitter MP knows the reserved timing information of the receiver MP, the TXOP may be determined without any collision with all reserved timing information known to the transmitter MP.

The reserved timing information may be a beacon timing. The beacon timing may include a beacon reception timing and/or a mesh deterministic access opportunity (MDAOP). The beacon reception timing is a timing of a received beacon frame at a receiver MP. The received beacon frame is received by the receiver MP from a neighboring MP of the receiver MP. The MDAOP allows a channel to be accessed at a selected time with less contention than typical contention occurring between MPs supporting mesh deterministic access (MDA). The MDAOP is a time period within every mesh delivery traffic indication message (DTIM) interval between a transmitting side and a receiving side. The transmitter MP may select the TXOP so that the TXOP does not collide with the beacon reception timing and/or the MDAOP. The transmitter MP may not extend the TXOP across the beacon reception timing and/or the MDAOP.

Figure 2:
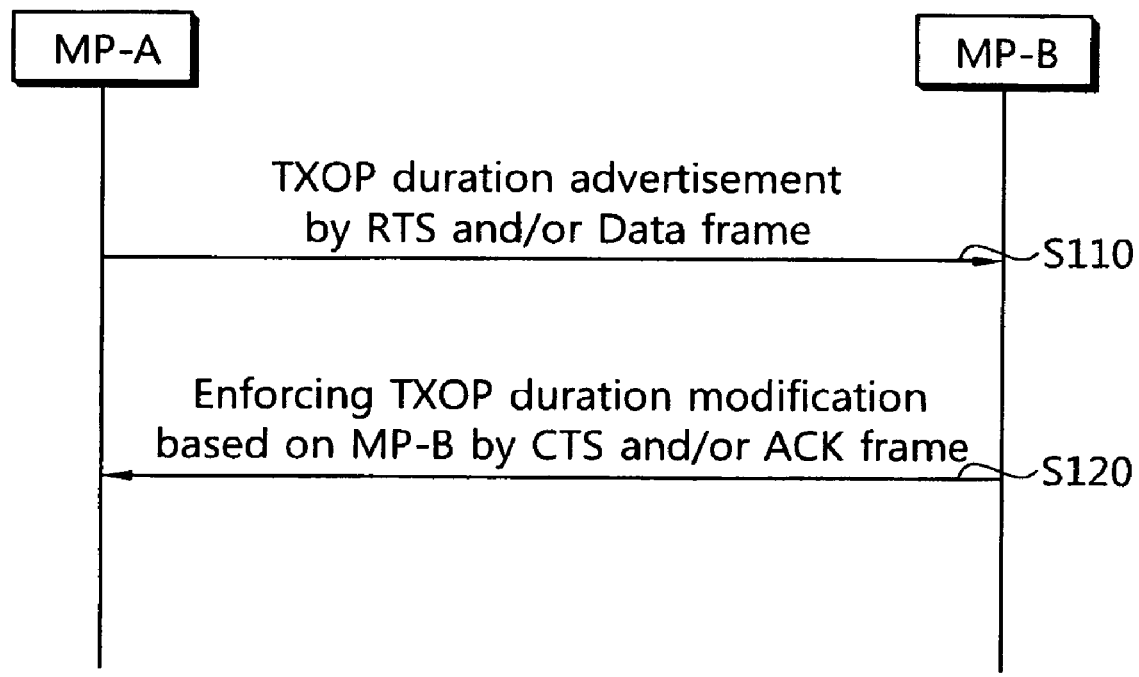
FIG. 2 is a flow diagram showing a method for setting up a transmission opportunity (TXOP) in a mesh network according to an embodiment of the present invention.

FIG. 2 is a flow diagram showing a method for a TXOP in a mesh network according to an embodiment of the present invention. A transmitter MP (i.e., MP-A) advertises a TXOP to be used by the transmitter MP to a receiver MP (i.e., MP-B) by using a duration field of a request-to-send (RTS) frame or a data frame (step S110). The duration field of the RTS frame includes a duration defining the period of time that the wireless medium is to be reserved to transmit the data frame and/or other frames.

An RTS signal is transmitted as the RTS frame is delivered in order to know whether a region is clear. When a target station receives the RTS signal, a clear-to-send (CTS) signal is transmitted as a response.

The transmitter MP has a frame to be transmitted, and can initiate a transmission procedure by sending the RTS frame. Although the transmitter MP can initiate transmission by using the RTS frame, transmission can also be initiated by using the data frame. In this case, the TXOP to be used by the transmitter MP may be advertised to the receiver MP via the duration field of the data frame.

The transmitter MP can advertise the TXOP to the receiver MP (i.e., MP-B) by using a specific frame including a duration field.

Figure 3:
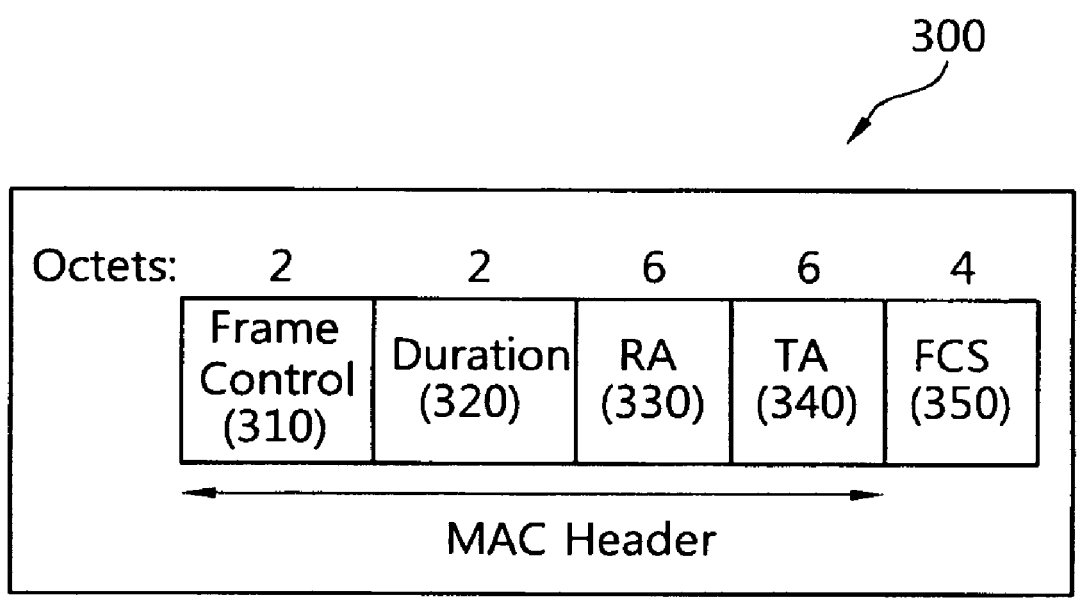
FIG. 3 shows an example of a request-to-send (RTS) frame.

FIG. 3 shows an example of an RTS frame. An RTS frame 300 includes a frame control field 310, a duration field 320, a receiver address (RA) field 330, a transmitter address (TA) field 340, and a frame check sequence (FCS) field 350.

The frame control field 310 is set to indicate the RTS frame. Other than that, the frame control field 310 is identical to that used in other control frames.

The duration field 320 includes a duration defining a time required for a frame exchange sequence. The RTS frame is intended to be used to reserve a medium in a full frame exchange duration. Thus, a transmitting side of the RTS frame calculates the time required for the frame exchange sequence after the RTS frame ends. After calculating a multiple of 1 microsecond required for transmission, the calculation result is inserted to the duration field 320.

The RA field 330 indicates an address of a receiver station. The TA field 340 indicates an address of a transmitter station transmitting the RTS frame. The FCS field 350 is used to allow a station to examine integrity of the received frame.

Figure 4:
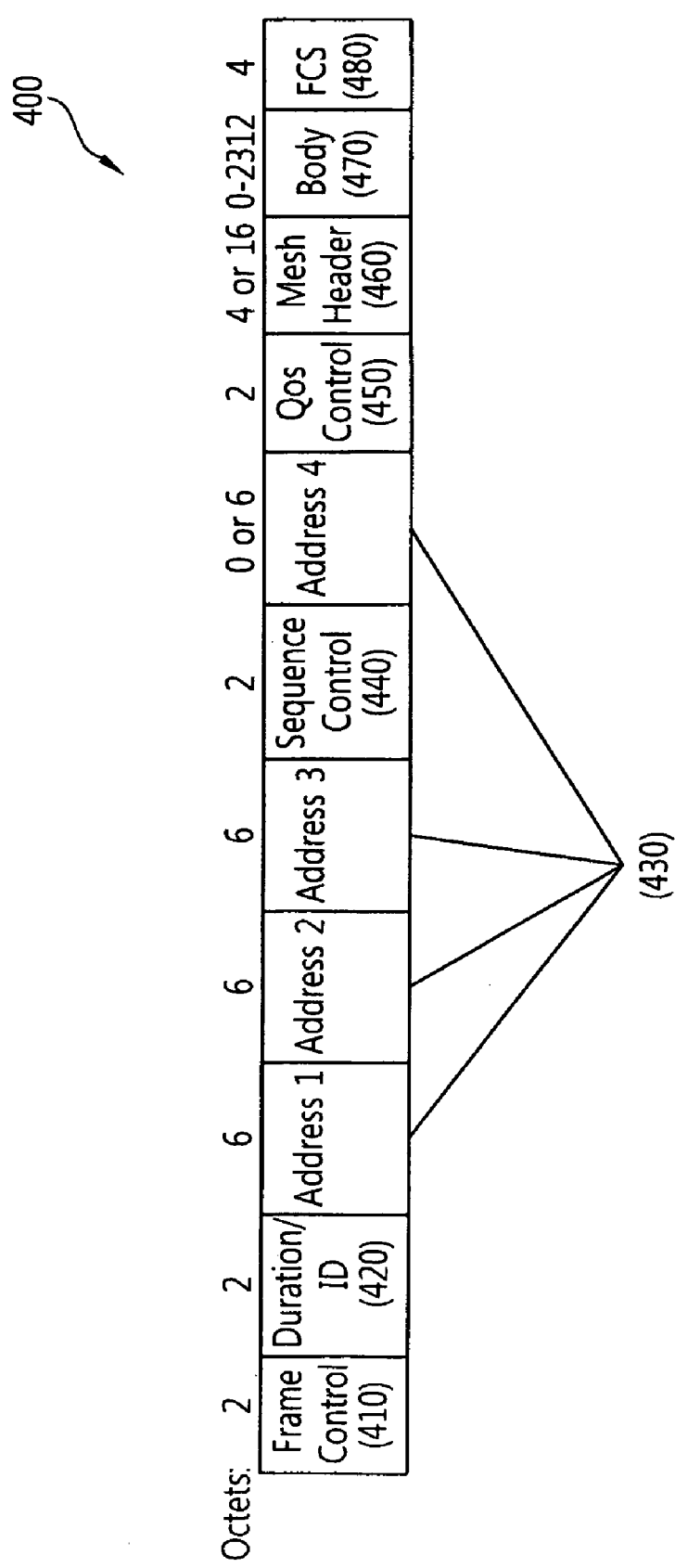
FIG. 4 shows an example of a data frame.

FIG. 4 shows an example of a data frame. A data frame 400 in a mesh network includes a frame control field 410, a duration/ID field 420, an address field 430, a sequence control field 440, a QoS control field 450, a mesh header field 460, a body field 470, and an FCS field 480.

The frame control field 410 indicates information (e.g., protocol version, power management, data request, distribution system (DS), etc.), and may have a length of 2 octets.

The duration/ID field 420 indicates a duration value for setting up a network allocation vector (NAV), and may have a length of 2 octets. The NAV is an indicator indicating a time period of communication through a wireless medium. Data collision occurring in the same channel can be avoided by the duration value of the duration/ID field, and a priority of data transmission can be allocated to a specific node.

The address field 430 indicates a basic service set identifier (BSSID), a destination address (DA), a source address (SA), a receiver address (RS), a transmitter address (TS), etc., and may include 4 fields each having a length of 6 octets. Nodes from and to which a data frame is transmitted can be known by the address field. One node can know another node to which the data frame is transmitted next.

The sequence control field 440 indicates a sequence number and a frame number, and may have a length of 2 octets.

The QoS control field 450 is used to confirm authenticity of the data frame, and may have a length of 2 octets. If the address field of the data frame confirms that the data frame is transmitted from an authenticated node, the data frame is removed by inserting an 'untrusted' bit to the QoS control field.

The mesh header field 460 is used to solve a problem that can occur in a relay procedure of the data frame in the mesh network, and has a subfield such as a mesh flag field, a time to live (TTL) field, a mesh end to end (E2E) sequence number field, a mesh addressing field, etc. The mesh flag field indicates that the data frame is a data frame of the mesh network. The TTL field is used to limit a time for hopping and delivering data. The TTL field prevents the data frame from infinite-loop transmission. The mesh E2E sequence number field is used to prevent an overflow of a broadcast control signal. The mesh addressing field is used to extend an address field for the mesh network.

The body field 470 is used to carry specific information according to each frame type and subtype, and may have various lengths ranging from 0 to 2312 octets.

The FCS field 480 is used to allow a station to examine integrity of the received frame, and may have a length of 4 octets. The FCS field includes a 32-bit cyclic redundancy code (CRC).

The aforementioned data frame is shown for exemplary purposes only, and thus a frame for data transmission is not limited thereto. The data frame may consist of fields of various contents, and each field may have various lengths.

The TXOP to be used by the transmitted MP can be advertised to the receiver MP in the duration/ID field 420 of the data frame.

Referring back to FIG. 2, if the TXOP, which is known as the duration field of the RTS frame or the data frame received by the receiver MP (i.e., MP-B), collides with the reserved timing information of the receiver MP, the receiver MP allows the transmitter MP to modify the TXOP by using the duration field of a CTS frame or an acknowledgement (ACK) frame (step S120). This is because the TXOP is regulated by the receiver MP.

If the transmitter MP initiates transmission by using the RTS frame, the TXOP is modified by using the duration field of the CTS frame. In addition, if the transmitter MP initiates transmission by using the data frame, the receiver MP transmits the ACK frame as a positive confirm response for the data frame, and allows the transmitter MP to modify the TXOP duration by using the duration field of the ACK frame.

The receiver MP may allow the transmitter MP to modify the TXOP duration by using a specific frame including a duration field.

Figure 5:
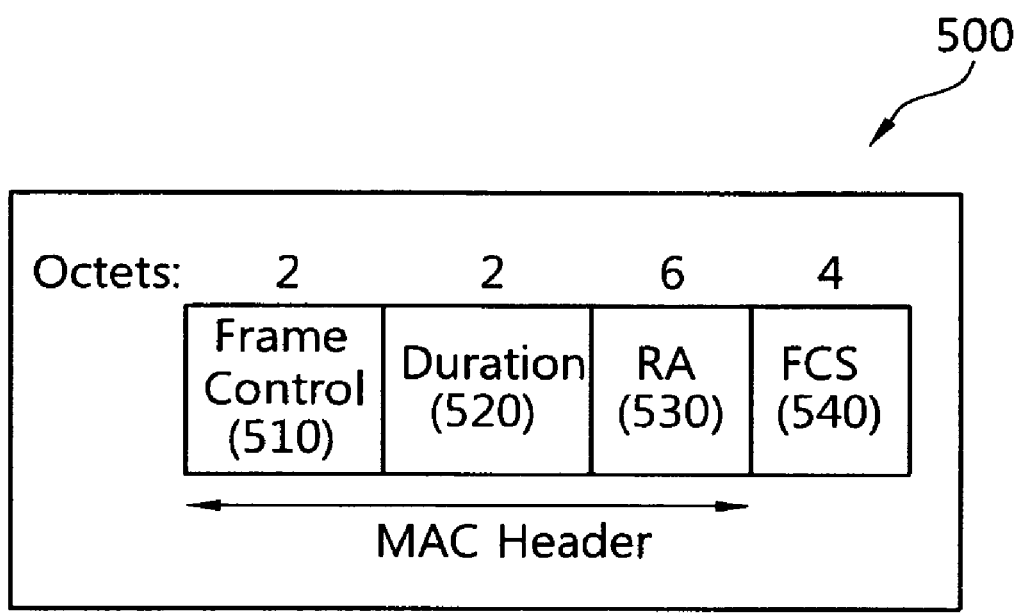
FIG. 5 shows an example of a clear-to-send (CTS) frame.

FIG. 5 shows an example of a CTS frame. A CTS frame 500 includes a frame control field 510, a duration field 520, an RA field 530, and an FCS field 540.

The frame control field 510 is set to indicate that the frame is the CTS frame.

The duration field 520 includes a time required to receive a frame. A station sending the CTS frame uses a duration field of an RTS frame as a basis for calculating a duration of the RTS frame. The station sending the CTS frame subtracts the time required for the CTS frame and one short inter-frame spaces (SIFS) located ahead of the CTS frame from the duration of the RTS frame, and places a new calculation result in the duration field of the CTS frame.

An address of a transmitter transmitting the RTS frame is copied in the RA field 530. The FCS field 540 is used to allow a station to examine integrity of the received frame.

Figure 6:
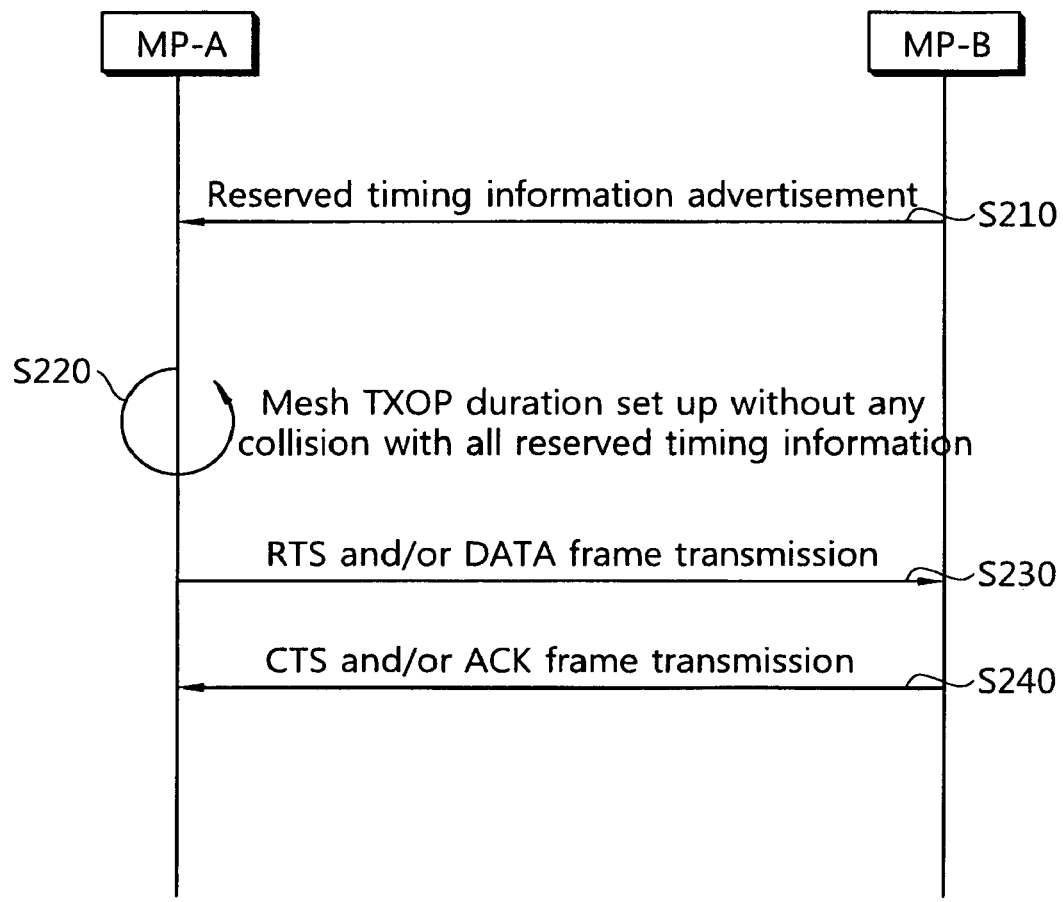
FIG. 6 is a flow diagram showing a method for a TXOP in a mesh network according to another embodiment of the present invention.

FIG. 6 is a flow diagram showing a method for a TXOP in a mesh network according to another embodiment of the present invention.

Referring to FIG. 6, a receiver MP (i.e., MP-B) may transmit reserved timing information to a transmitter MP (step S210). The reserved timing information may be a beacon timing. The beacon timing may include a beacon reception timing and/or, a MDAOP. The beacon reception timing is a timing of a received beacon frame at a receiver MP. The received beacon frame is received by the receiver MP from a neighboring MP of the receiver MP. The beacon timing may be transmitted in a beacon frame or a probe response frame. The beacon frame and the probe response frame are used for synchronization between MPs.

The transmitter MP set up a TXOP without any collision with all reserved timing information known to the transmitter MP (step S220). The transmitter MP determines the TXOP not to be extended across the reserved timing information. This means that the TXOP is not overlapped with the reserved timing information. When the reserved timing information include a plurality of beacon reception timings received from a plurality of neighboring MPs of the receiver MP, the TXOP may not be extended across the plurality of beacon reception timings. The TXOP may not include a time interval for a beacon frame.

When the transmitter MP receives the beacon reception timing of the receiver MP, the transmitter MP can know a beacon reception timing of neighbor MPs of the receiver MP. The beacon reception timing may be used to determine a target beacon transmission time (TBTT) of 2 hop neighbor MPs. The TXOP may be determined without any collision with the TBTT of the 2 hop neighbor MPs.

Referring again to FIG. 6, the transmitter MP may transmit an RTS frame or a data frame within the TXOP (step S230). A duration in the RTS frame may be within the TXOP. The receiver MP transmits a CTS frame or ACK frame in response to the received frame (step S240).

Figure 7:
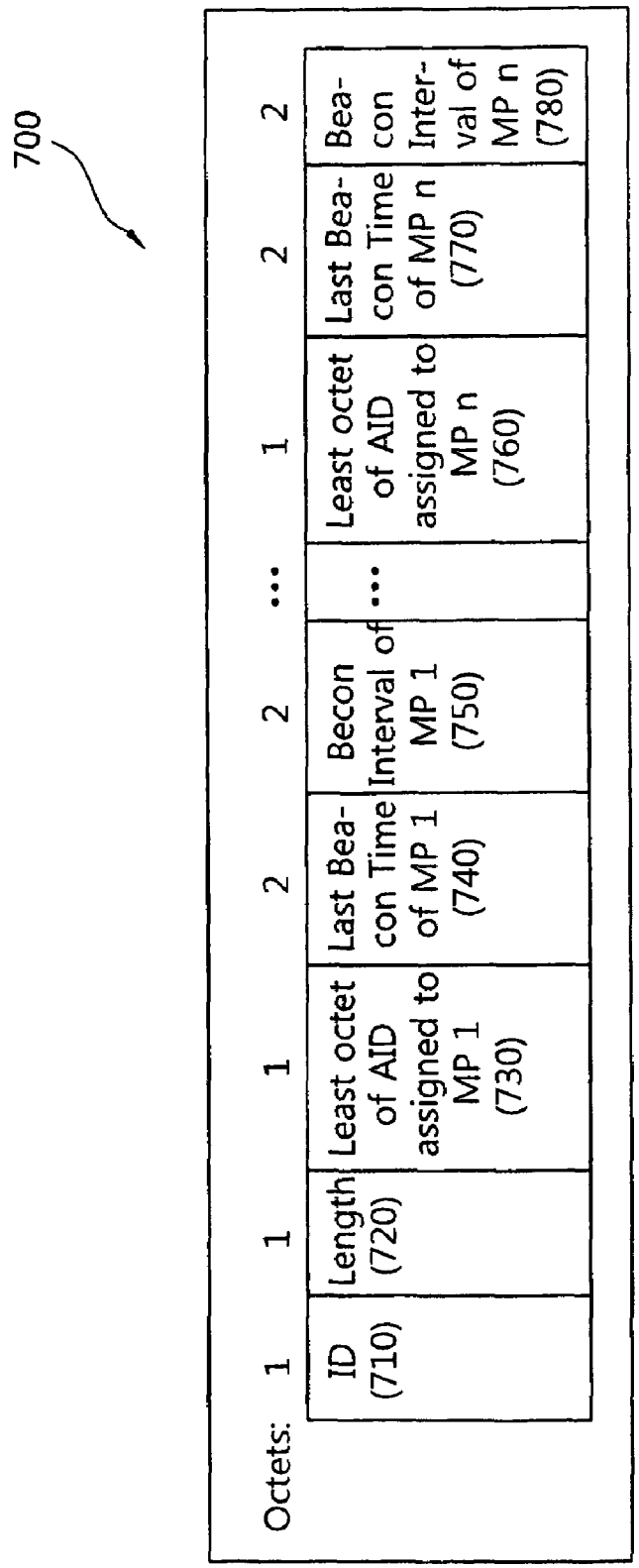
FIG. 7 shows an example of a beacon timing element.

FIG. 7 shows an example of a beacon timing element. The beacon timing element is used to carry beacon timing information of neighbor stations (STAs). A beacon timing element 700 includes an ID field 710, a length field 720, a 'least octet of association identifier (AID) assigned to MP1' field 730, a 'last beacon time of MP1' field 740, a 'beacon interval of MP1' field 750, a 'least octet of AID assigned to MP n' field 760, a 'last beacon time of MP n' field 770, and a 'beacon interval of MP n' field 780.

The ID field 710 is set to a value indicating the beacon timing element. The length field 720 is set to a value indicating a length of the element 700. The beacon timing information of the neighbor STAs is known as a 'least octet of AID' field, a 'last beacon time' field, and a 'beacon interval' field which are provided in pair. If an MP advertises a plurality of beacon timings, the pairs of information sets are included in the information element.

The 'least octet of AID assigned to MP1' field 730 includes a final octet of an AID value assigned to a neighbor MP if a peer link is maintained with the MP1, and includes '0' if the peer link is not maintained with the MP1.

The 'last beacon time of MP1' field 740 includes a most recent beacon reception timing from a value (i.e., 256 ms) measured by a local timing synchronization function (TSF) timer.

The 'beacon interval of MP1' field 750 indicates a beacon interval used by the MP 1. Thus, each of the 'least octet of AID assigned to MP n' field 760, the 'last beacon time of MP n' field 770, and the 'beacon interval of MP n' field 780 includes the aforementioned contents in association with each MP n.

The transmitter MP can know the beacon reception timing of the neighbor MPs of the receiver MP via the beacon timing element and can determine the TXOP not to extend across the beacon reception timing of the neighbor MPs to mitigate collision. In addition, the TXOP may be set up without any collision with all reserved timing information known to the transmitter MP.

Figure 8:
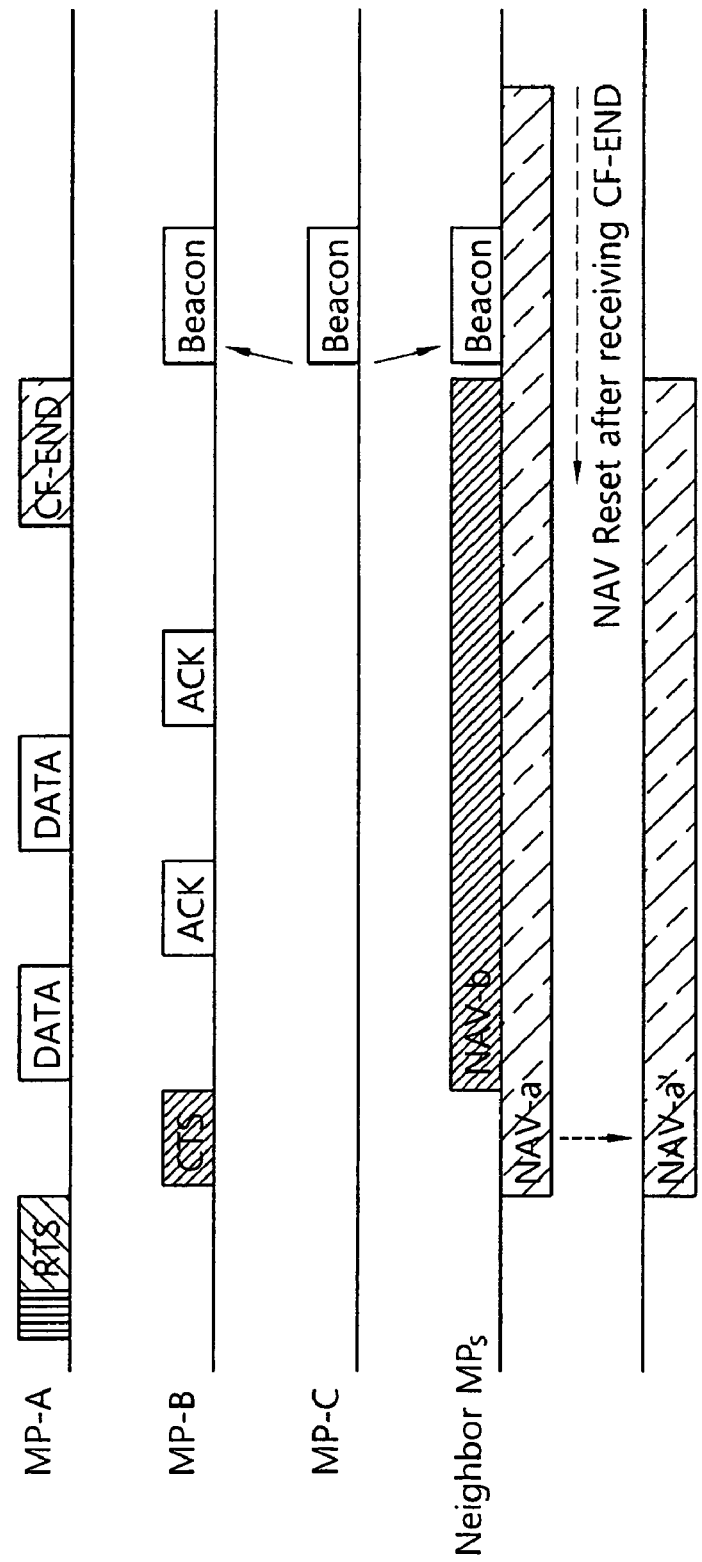
FIG. 8 shows a relation among MPs with respect to a TXOP.

FIG. 8 shows a relation among MPs with respect to a TXOP. When a transmitter MP (i.e., MP-A) transmits an RTS frame, a TXOP obtained by the transmitter MP (i.e., MP-A) is notified to neighbor MPs. The neighbor MPs set up a network allocation vector-a (NAV-a) according to a time required by the TXOP. An NAV is a timer indicating timing information when a medium is reserved. The NAV is set to a time expected to use the medium including all frames required to complete a current operation. Thus, if the NAV-a is depicted in a bar shape as shown in FIG. 8, the neighbor MPs have to delay access to the medium by a length of the bar.

There are Short inter-frame spaces (SIFSs) between an RTS frame and a CTS frame, between the CTS frame and a data frame, and between the data frame and an ACK frame. The SIFS is used to transmit a frame having a top priority such as the RTS/CRS frame or the ACK frame. A frame having a high-level priority can perform communication after the SIFS elapses. When the frame having the high-level priority starts to be transmitted, the medium is in use. Thus, after the SIFS elapses, a frame in transmission has priority over other frames to be transmitted after a long period of time.

Although a frame at which transmission is initiated is an RTS frame in the present embodiment, the frame may be a data frame. In this case, the NAV-a is set up when the data field is transmitted by using a duration field of the data frame.

In addition, a receiver MP (i.e., MP-B) transmits the CTS frame by inserting an NAV-b to a CTS frame header, and sets up the NAV-b in the CTS frame when the CTS frame is transmitted. The NAV-b is a result obtained by subtracting the time required for the CTS frame and one SIFS located ahead of the CTS frame from a duration of the RTS frame.

Referring again to FIG. 8, the NAV-a collides with the beacon reception time from an MP-C to the receiver MP (i.e., MP-B). That is, this is a case where collision occurs with the reserved timing information of the receiver MP (i.e., MP-B). In this case, the receiver MP (i.e., MP-B) allows the transmitter MP (i.e., MP-A) to modify a TXOP duration by using the duration field of the CTS frame. If the transmitter MP initiates transmission by using the data frame, the TXOP duration is modified by using a duration field of the ACK frame. Thus, the transmitter MP (i.e., MP-A) has to modify the TXOP duration, and the NAV-a is shortened to NAV-a'.

If the TXOP of the transmitter MP (i.e., MP-A) collides with the reserved timing information of the receiver MP (i.e., MP-B), the transmitter MP (i.e., MP-A) may transmit a contention free (CF)-end frame to modify the TXOP duration. By transmitting the CF-end frame, STAs exit from a point coordination function (PCF) access mode, and thus a contention-based service starts. After receiving the CF-end frame, the NAV-a is modified to the NAV-a'.

Therefore, the neighbor MPs experience a delay in accessing to the medium according to the modified NAV-a' and the NAV-b. After completion of RTS/CTS exchange, the transmitter MP (i.e., MP-A) transmits a data frame. The receiver MP (i.e., MP-B) transmits an ACK frame as a positive confirm response for the data frame. The data frame may be transmitted as one frame, or may be transmitted by being fragmented as shown in FIG. 8. The data fragments and an ACK response thereof are divided by SIFSs. Accordingly, the STAs maintain a control on a channel in a fragment burst duration.

In a contention-based mesh network, contention between a beacon frame and other frame may be mitigated. Overall managements and regulations can be effectively achieved among a transmitter mesh point (MP), a receiver MP, and neighbor MPs in a mesh network.

Figure 9:
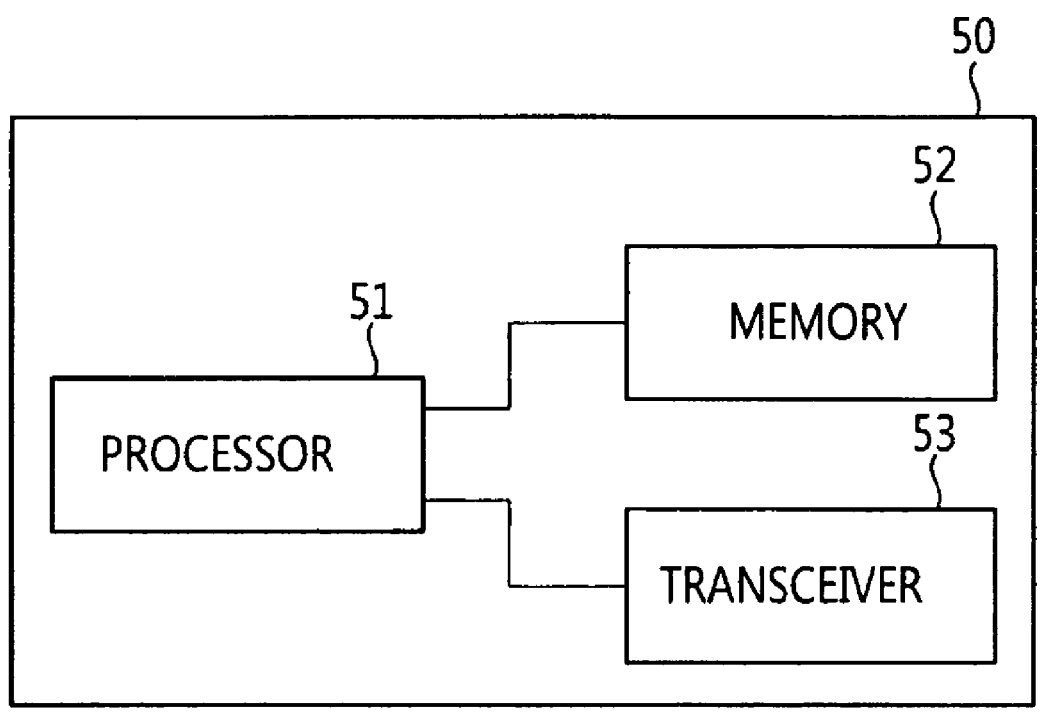
FIG. 9 is a block diagram showing constitutional elements of an apparatus for wireless communication

FIG. 9 is a block diagram showing constitutional elements of an apparatus for wireless communication 50, that can be either an STA or MP of FIG. 1, and that can perform the methods described above. The apparatus 50 includes a processor 51, a memory 52, and a transceiver 53. The processor 51 may implement the embodiments shown in FIG. 2 and/or FIG. 6. The memory 52 is coupled to the processor 51 and stores various parameters. The transceiver 53 is coupled to the processor 51 and transmits and/or receives various frames.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of communicating in a wireless mesh network, performed by a transmitter mesh point (MP), the method comprising:
   receiving a plurality of beacon timings from a plurality of receiver MPs with which the transmitter MP keeps synchronization, each beacon timing including a beacon timing element of a respective receiver MP, the beacon timing element including an identifier, a beacon time and a beacon interval, the identifier identifying a neighbor station of a corresponding receiver MP, the beacon time indicating a target beacon transmission time (TBTT) of the neighbor station measured by the corresponding receiver MP, the beacon interval indicating an interval of a beacon frame used by the neighbor station;
   determining a transmission opportunity (TXOP) not to be extended across all of the plurality of beacon timings, the TXOP being an interval of time when the transmitter MP has a right to initiate a transmission of frames other than a beacon frame; and
   transmitting a frame from the transmitter MP to one of the plurality of receiver MPs within the TXOP.

2. The method of claim 1, wherein each beacon timing is received in a beacon frame or a probe response frame.

3. An apparatus for wireless communication in a wireless mesh network, the apparatus comprising:
   a transceiver; and
   a processor operatively connected to the transceiver, the processor configured to:
      receive a plurality of beacon timings from a plurality of receiver MPs with which the apparatus keeps synchronization, each beacon timing including a beacon timing element of a respective receiver MP, the beacon timing element including an identifier, a beacon time and a beacon interval, the identifier identifying a neighbor station of a corresponding receiver MP, the beacon time indicating a target beacon transmission time (TBTT) of the neighbor station measured by the corresponding receiver MP, the beacon interval indicating an interval of a beacon frame used by the neighbor station,
      determine a transmission opportunity (TXOP) not to be extended across all of the plurality of beacon timings, the TXOP being an interval of time when the transmitter MP has a right to initiate a transmission of frames other than a beacon frame, and
      transmit a frame to one of the receiver MPs plurality of within the TXOP.

4. The apparatus of claim 3, wherein the each beacon timing is received in a beacon frame or a probe response frame.

5. The method of claim 1, wherein the identifier includes last 7 least significant bits of an association identifier assigned to the neighbor station.

6. The apparatus of claim 3, wherein the identifier includes last 7 least significant bits of an association identifier assigned to the neighbor station.

* * * * *